ADDRESSING SYSTEM FOR COMPUTER MEMORIES

Filed Sept. 2, 1965

INVENTOR.
Václav Černý

BY Richard Low
Ag't

United States Patent Office 3,380,034

Patented Apr. 23, 1968

3,380,034

ADDRESSING SYSTEM FOR COMPUTER MEMORIES

Václav Černý, Prague, Czechoslovakia, assignor to Výzkumný ústav matematických strojů, Prague, Czechoslovakia Filed Sept. 2, 1965, Ser. No. 484,611
Claims priority, application Czechoslovakia, July 17, 1963, 4,139/63
9 Claims. (Cl. 340—172.5)

ABSTRACT OF THE DISCLOSURE

In an address system for computer memories, in which the word length capacity is half a complete word length and the complete words are addressed by a pair of addresses, the first address is directly retrieved from the pair of addresses. The other address is obtained from the pair of addresses by a change in value of the digit of the highest decimal order only of the first address if the highest possible digit of the respective decimal order is an even digit and by a change in value of digits of the two highest decimal orders of the first address if the highest possible digit in the highest decimal order of any address number is an uneven digit. A selectively operable control arrangement provides retrieval and read-out of address words directly for the one address of the pair and provides retrieval and read-out of changed values of address words for the other address of the pair.

Figure 1:
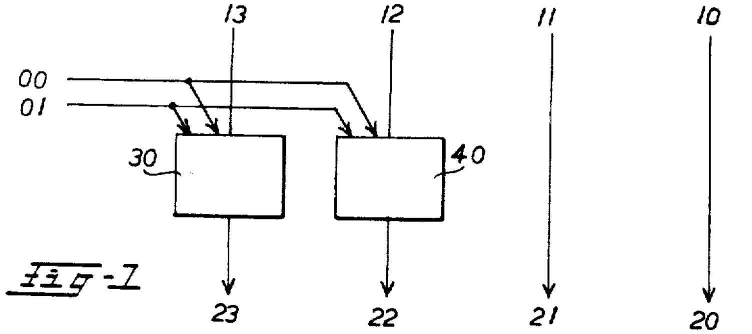

The present invention relates to an addressing system for computer memories in which the word-length storage capacity is less than the length of complete words, and more particularly, to such an addressing system operating with an economy of equipment.

Addressing systems used in computer equipment often require that a memory or storage device has to store a plurality of information words, which are placed in cells having addresses assigned thereto. Selection and retrieval systems are necessary in order to retrieve the desired word from a specific address, and to use such desired word in the operation to be performed, or in the processing of the data to be retrieved.

Data processing machines are often designed to have a specific word length to be stored at any one address. If it is desired, however, to store words having a longer length, that is, which contain a larger number of numerals, or if the word length is to be reduced for a given memory, then, in order to retrieve an entire word, it has to be split up and placed into two address positions. It is customary in such instances to place words of half their normal length at any one address. In this case, the data processing equipment operates with twice the number of words, and each word has half the number of digits or numerals assigned thereto. This requires twice the number of addresses for the memory, since each word has to be combined from a plurality of addresses.

Let A be the number which is assigned to a specific address. In order to store a word longer than the word capacity of the storage device, a so-called auxiliary address A′ must be provided, and the word retrieved from A and A′ must then be combined for further processing. It is clear that, when the address A is within the region of numbers 0 to $n/2-1$ then the auxiliary or supplementary address A′ must be within the region of $n/2$ to $n-1$. In this case the following relationships will govern:

$$0 \leq A \leq (n/2-1) \qquad (1)$$

$$n/2 \leq A' \leq (n-1) \qquad (2)$$

wherein $n$ is the number of the addresses and A or A′, respectively, is the continuous number or the sequence of addresses within the storage element.

In order to satisfy the conditions, the auxiliary address, that is, its running number or order number, may be established by the following relationships:

$$A' = n/2 + A \text{ or} \qquad (3)$$

$$A' = (n-1) - A \qquad (4)$$

Known apparatus to instrument the mathematics of both of these alternatives require an adder to add the words of the addresses, which unduly complicates the system and increases the expense.

It is an object of the present invention to provide a simple system for addressing computer memories in which the word length storage capacity is less than the length of the complete word, which is inexpensive, simple to construct, and easy in operation and in programming.

Briefly, in accordance with the present invention, complete words are addressed by a pair of addresses, as known. Means are provided to retrieve the word of one of the addresses directly; means are further provided to change the value of predetermined digits of the word which are associated with the means to retrieve the word of the first address; and selectively operable control means are provided which are connected to the means to change the value in order to provide for retrieval and read-out of words directly from the first address of the pair, and to provide for retrieval and read-out of changed values from the other address of the pair. Specifically, a transfer circuit is provided which is connected to the memory and which has a pair of outputs for each word, one of which has a value of a number assigned thereto and the other has a different value assigned thereto; and the control means, which may be a flipflop capable of having a pair of states, permit read-out from either the one or the other of the outputs, to thus permit directly addressing of the word when the control means is in one state and obtain a read-out of one number and to permit further addressing of the word at another address and obtain read-out of the number having a different value when the control means is in the other state.

Figure 2:
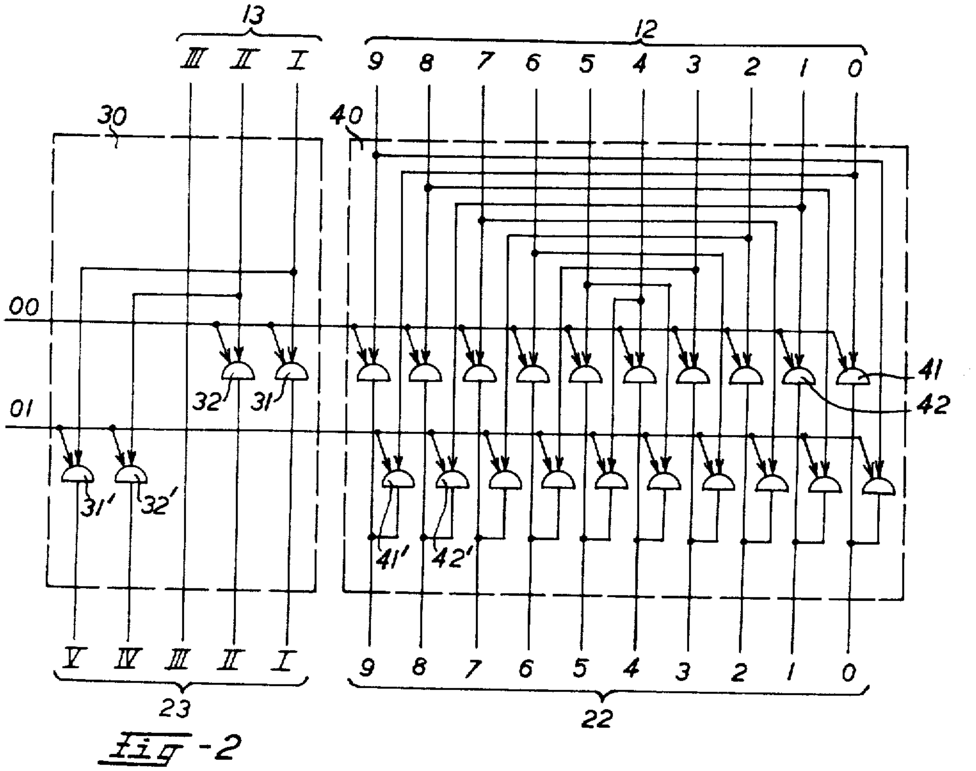

The structure, organization and operation of the invention will now be described more specifically in the following detailed description with reference to the accompanying drawings, in which:

FIG. 1 illustrates, in block diagram form, an arrangement according to the present invention; and FIG. 2 is a more detailed view, also in schematic form, of the system according to FIG. 1, and in which the highest digit of a number $n$ is an odd number, for example, $n=5$, for a total value of 5,000.

Referring now to the drawings, FIG. 1 shows lines 10–20, 11–21, 12–22 and 13–23, as address paths. Line 10–20 is for unit values, line 11–21 for tens, line 12–22 for hundreds, and line 13–23 for thousands. The transfer circuit in this case consists of two elements, shown as blocks 30 and 40, switched into the lines of the hundreds and the thousands, and controlled by connections labelled 00 and 01.

FIG. 2 illustrates the blocks 30, 40, in more detail. As in FIG. 1, block 30 is switched into line 13–23. Line 13 itself has three individual conductors, labeled I, II, III, but has five output lines 23, labeled I, II, III, IV, and V. Input line 12 connected to block 40 has ten inputs, labeled 0 . . . 9 and as many output lines as inputs.

Block 30 contains four AND gates 31, 31′, 32, 32′; and block 40 contains twenty AND gates 41, 41′, 42, 42′ . . ., also controlled by conductors 00 and 01, respectively.

The tables below illustrate the conversion effected.

TABLE I

| | | | | | | | | | | |
|---|---|---|---|---|---|---|---|---|---|---|
| Block 30: Input | I | 0000 | II | 1000 | III | 2000 | | | | |
| Output: | | | | | | | | | | |
| Line 00 active | I | 0000 | II | 1000 | III | 2000 | IV | ---- | V | ---- |
| Line 01 active | I | ------ | II | | | | | | | |
| Do | V | 4000 | IV | 3000 | III | 2000 | | | | |

TABLE II

| | | | | | | | | | | |
|---|---|---|---|---|---|---|---|---|---|---|
| Input | 0 | 1 | 2 | 3 | 4 | 5 | 6 | 7 | 8 | 9 |
| Output: | | | | | | | | | | |
| Line 00 active | 0 | 1 | 2 | 3 | 4 | 5 | 6 | 7 | 8 | 9 |
| Line 01 active | 9 | 8 | 7 | 6 | 5 | 4 | 3 | 2 | 1 | 0 |

Block 30, as can be seen, controls the thousands and block 40 controls the hundreds; thus, activating input line I of block 30, and line 4 of block 40 results in the address number $A=0400$. The auxiliary address A' will then be $A'=4500$, because, by switching from activation of line 00 to activating the line 01, output conductor V, assigned a value of $V=4000$, will be activated. Likewise, in the hundreds column, output line 5 within block 40 will be activated. When the highest number of the thousands is 2, then output line III need not be controlled by a separate gate, and output and input lines III may remain the same. Thus, only the hundreds would change within the address; so, for example, $$A=2354$$

with control line 00 active; and $$A'=2654$$

with control line 01 active.

The switching arrangement illustrated in FIGS. 1 and 2 permits generation of any address number of $A=0000$ up to $A=2499$, and to provide for a corresponding auxiliary or supplementary address $A'=2500$ to 4999. In case that the highest number of the address $n$ is an even number—for example, $n=4000$, the line III—III within block 30 can be omitted, and numbers I, II will then have the significance of 000, 1000, 2000, 3000, respectively. Block 40 in lines 12–22 can also be omitted in such a case because any address A can be associated with a supplementary address A' which differs from the main address only by the first number, for example, $A=1369$:

$$A=1369 \quad A'=2369$$
$$A=0228 \quad A'=3228$$

The present invention has been described in terms of block diagrams and schematic diagrams. It will be obvious to those skilled in the art that the logic and particular components and elements indicated by the block diagrams and interconnections may be implemented by a variety of well-known circuitry. It is therefore thought unnecessary to describe the exact components on a level more detailed than that required for the understanding by those skilled in the art. It is also to be understood that appropriate interlock or buffer circuit paths are to be provided when necessary, in accordance with good design techniques, to prevent feedback of signals or undesirable circuit paths which might influence other circuits to respond spuriously and not in accordance with the invention concept. Such buffers and interlock circuits are not shown on the drawings, and the detailed description thereof has been omitted in the interest of clarity and brevity. Their proper use will be obvious to those skilled in the art.

The logic elements described and shown in the drawings and utilized by the apparatus of the present invention are known in the art and described in various publications, for example, in the book entitled "Design of Transistorized Circuits for Digital Computers," by A. I. Pressman: John F. Ryder, Publisher, Inc., New York, 1959.

I claim:

1. Addressing system for computer memories in which the word length storage capacity is half of a complete word length and the complete words are addressed by a pair of addresses, said addressing system comprising means retrieving the word of one address directly; means including a plurality of AND gates for changing the value of predetermined digits of said word associated with said retrieval means; and selectively operable control means connected to said value changing means to provide retrieval and read-out of address words directly for said one address of said pair and to provide retrieval and read-out of changed values of address words for the other address of said pair.

2. Addressing system for computer memories in which the word length storage capacity is half of a complete word length and the complete words are addressed by a pair of addresses, said addressing system comprising means retrieving the word of one address directly; means changing the value of predetermined digits of said word associated with said retrieval means; and selectively operable control means connected to said value changing means to provide retrieval and read-out of address words directly for said one address of said pair and to provide retrieval and read-out of changed values of address words for the other address of said pair, said control means being responsive to a 0–1 control code to provide for direct read-out of words when the control is ZERO and for a changed value of read-out of words when the control is a ONE.

3. Addressing system for computer memories in which the word length storage capacity is half of a complete word length and the complete words are addressed by a pair of addresses, said addressing system comprising means retrieving the word of one address directly; means changing the value of predetermined digits of said word associated with said retrieval means, the value change of the predetermined digit being a doubling of value of the highest order; and selectively operable control means connected to said value changing means to provide retrieval and read-out of address words directly for said one address of said pair and to provide retrieval and read-out of changed values of address words for the other address of said pair.

4. Addressing system for computer memories in which the word length storage capacity is half of a complete word length and the complete words are addressed by a pair of addresses, said addressing system comprising means retrieving the word of one address directly; means changing the value of predetermined digits of said word associated with said retrieval means, the value change of the predetermined digit being a change to the complement of the number, and selectively operable control means connected to said value changing means to provide retrieval and read-out of address words directly for said one address of said pair and to provide retrieval and read-out of changed values of address words for the other address of said pair.

5. Addressing system for computer memories in which the word length storage capacity is half of a complete word length and the complete words are addressed by a pair of addresses, said addressing system comprising means retrieving the word of one address directly; means changing the value of predetermined digits of said word associated with said retrieval means, said means changing the value of predetermined digits comprising input connection means associated with the number to be changed, a pair of output connection means for each number to be changed, one of said output means being assigned to the number directly and the other being assigned to the changed value, and a pair of control gates having the inputs thereto connected to said input connection means and the outputs connected to respective outputs assigned to said number directly and to said changed value, said gates being selectively controllable by said control means; and selectively operable control means connected to said value changing means to provide retrieval and read-out of address words directly for said one address of said pair and to provide retrieval and the read-out of changed values of address words for the other address of said pair.

6. In an addressing system in which word length storage capacity of the memory per word is less than the value of a desired number having means providing auxiliary addressing to increase the value of the address number, the improvement comprising a transfer circuit connected to said memory and having a pair of outputs for each address word, one of which has a value of the address number assigned thereto and the other has a different value assigned thereto; and selectively operable control means capable of having a pair of states permitting output from either of said outputs of said pair to permit direct addressing of said word when said control means is in one state and obtain read-out of said numbers and to permit auxiliary addressing and obtain read-out of said number having a different value assigned thereto when said control means is in said other state.

7. In a system as claimed in claim 6, wherein said different value assigned to the other output is the complement of the number.

8. In a system as claimed in claim 6, wherein said different value assigned to the other output is twice the value of said number.

9. An addressing system for computer memories in which the word lentgh storage capacity is half a complete word length and the complete words are addressed by a pair of addresses, said addressing system comprising means for directly retrieving the first address from said pair of addresses; means associated with said retrieval means for obtaining the other address from said pair of addresses by a change in value of the digit of the highest decimal order only of said first address if the highest possible digit of the respective decimal order is an even digit and by a change in value of digits of the two highest decimal orders of said first address if the highest possible digit in the highest decimal order of any address number is an uneven digit; and selectively operable control means connected to said value changing means to provide retrieval and read-out of address words directly for said one address of said pair and to provide retrieval and read-out of changed values of address words for the other address of said pair.

References Cited

UNITED STATES PATENTS

| | | | |
|---|---|---|---|
| 3,315,233 | 4/1967 | Capbo et al. | 340—172.5 |
| 3,284,778 | 11/1966 | Trauboth | 340—172.5 |
| 3,270,324 | 8/1966 | Meade et al. | 340—172.5 |
| 3,208,047 | 9/1965 | Ridler | 340—172.5 |
| 3,185,966 | 5/1965 | Bennett et al. | 340—172.5 |

ROBERT C. BAILEY, *Primary Examiner.*

G. D. SHAW, *Assistant Examiner.*